US012039894B2

(12) United States Patent
Dunn et al.

(10) Patent No.: US 12,039,894 B2
(45) Date of Patent: Jul. 16, 2024

(54) DISPLAY ASSEMBLY WITH UNOBSTRUCTED ZONE

(71) Applicant: Manufacturing Resources International, Inc., Alpharetta, GA (US)

(72) Inventors: William Dunn, Alpharetta, GA (US); Mike Brown, Cumming, GA (US)

(73) Assignee: Manufacturing Resources International, Inc., Alpharetta, GA (US)

(*) Notice: Subject to any disclaimer, the term of this patent is extended or adjusted under 35 U.S.C. 154(b) by 0 days.

(21) Appl. No.: 17/900,382

(22) Filed: Aug. 31, 2022

(65) Prior Publication Data

US 2024/0096247 A1 Mar. 21, 2024

(51) Int. Cl.
*G09F 13/04* (2006.01)

(52) U.S. Cl.
CPC ...... *G09F 13/0445* (2021.05); *G09F 13/0413* (2013.01); *G09F 13/0495* (2021.05)

(58) Field of Classification Search
CPC ............ G09F 13/0445; G09F 13/0413; G09F 13/0495
See application file for complete search history.

(56) References Cited

U.S. PATENT DOCUMENTS 2,029,221 A 1/1936 Burgess et al.
2,678,860 A 5/1954 Peterson
3,587,186 A 6/1971 Lane
D222,989 S 2/1972 Cohen
3,984,931 A 10/1976 Belokin, Jr.
4,169,327 A 10/1979 Stilling
4,267,657 A 5/1981 Kloke
4,327,513 A 5/1982 de Gunzburg
4,452,000 A 6/1984 Gandy
4,547,987 A 10/1985 Stilling
4,718,185 A 1/1988 Conlin et al.
4,759,143 A 7/1988 Pomerleau
4,817,317 A 4/1989 Kovalak, Jr.
4,903,423 A 2/1990 Hinca
D306,464 S 3/1990 Axtell
4,905,390 A 3/1990 Stilling
D311,722 S 10/1990 Cheng
(Continued)

FOREIGN PATENT DOCUMENTS

AU 2015229457 B2 3/2019
AU 2019315350 B2 9/2022
(Continued)

OTHER PUBLICATIONS

The Free Dictionary, Bolt—Definition of bolt by The Free Dictionary, Jun. 15, 2016, 1 Page.
(Continued)

*Primary Examiner* — Cassandra Davis
(74) *Attorney, Agent, or Firm* — Standley Law Group LLP; Jeffrey S. Standley; Adam J. Smith

(57) ABSTRACT

Display assemblies are provided. One or more electronic display subassemblies are mounted to a framework at an elevated position. An unobstructed zone is located below each of the electronic display subassemblies and within said framework. Wiring and electronic components may extend along some of the framework and may be covered by cladding.

13 Claims, 7 Drawing Sheets

(56) References Cited

U.S. PATENT DOCUMENTS 5,025,355 A 6/1991 Harwood
5,179,367 A 1/1993 Shimizu
5,299,109 A 3/1994 Grondal
5,306,156 A 4/1994 Gibbs et al.
D357,944 S 5/1995 Atwell et al.
5,423,142 A 6/1995 Douglas et al.
D360,078 S 7/1995 Sarkisian et al.
5,457,905 A 10/1995 Kaplan
5,493,802 A 2/1996 Simson
D373,120 S 8/1996 Andre et al.
D375,980 S 11/1996 Current
D380,191 S 6/1997 White
5,717,424 A 2/1998 Simson et al.
5,755,050 A 5/1998 Aiken
5,803,424 A 9/1998 Keehn et al.
D403,434 S 12/1998 Sander
D408,554 S 4/1999 Dinwoodie
D410,036 S 5/1999 Washington
5,899,027 A 5/1999 St. Louis
D410,751 S 6/1999 Meier
D415,736 S 10/1999 Witte
6,050,833 A 4/2000 Danzyger et al.
6,172,869 B1 1/2001 Hood, III et al.
D438,258 S 2/2001 Itoh et al.
6,198,222 B1 3/2001 Chang
6,231,446 B1 5/2001 Majima et al.
D446,821 S 8/2001 Decaux
D447,183 S 8/2001 Wilmotte
D453,194 S 1/2002 Gentelia et al.
D455,789 S 4/2002 Schlueter
6,396,239 B1 5/2002 Benn et al.
6,405,463 B1 6/2002 Roddy et al.
D461,785 S 8/2002 Wilmotte
6,469,752 B1 10/2002 Ishikawa et al.
D467,561 S 12/2002 Kosciolek
6,494,429 B2 12/2002 Tajima
6,557,284 B2 5/2003 Nolan
D479,859 S 9/2003 Strunk et al.
6,639,571 B2 10/2003 Wang
D483,074 S 12/2003 Strunk et al.
D486,188 S 2/2004 Norcross et al.
6,748,685 B2 6/2004 Peel
6,758,002 B1 7/2004 Duguay
D493,842 S 8/2004 Norcross et al.
D500,143 S 12/2004 Moncho et al.
D501,889 S 2/2005 Harris et al.
D505,113 S 5/2005 Lam
D509,543 S 9/2005 Hillstrom et al.
6,962,528 B2 11/2005 Yokota
6,976,330 B2 12/2005 Milliken
6,977,627 B1 * 12/2005 Dalton .................. G06F 3/1431
345/905
D514,913 S 2/2006 Dunn et al.
D530,432 S 10/2006 Gottesdiener
D530,686 S 10/2006 Reza
D535,034 S 1/2007 Gottesdiener
7,210,839 B2 5/2007 Jung et al.
D544,848 S 6/2007 Marz et al.
7,226,176 B1 6/2007 Huang
D547,740 S 7/2007 Otani
7,292,435 B2 11/2007 She
D560,668 S 1/2008 Pritchard et al.
D562,407 S * 2/2008 Graziani ........................ D20/39
7,339,782 B1 3/2008 Landes et al.
D579,053 S 10/2008 Rubie et al.
D582,478 S 12/2008 Loerakker
D585,943 S 2/2009 Pymm et al.
D587,315 S * 2/2009 Piantanida ..................... D20/39
D587,760 S 3/2009 Miranda
D590,890 S 4/2009 King et al.
7,513,830 B2 4/2009 Hajder et al.
D592,705 S * 5/2009 Giugiaro ........................ D20/39
D593,213 S 5/2009 Grimshaw et al.
D595,645 S 7/2009 Beghelli
D595,678 S 7/2009 Dunn
7,589,958 B2 9/2009 Smith
7,591,508 B2 9/2009 Chang
7,601,067 B2 10/2009 Anderson
7,609,506 B2 10/2009 Aguirre
D603,973 S 11/2009 Jackson et al.
D608,775 S 1/2010 Leung
D610,536 S 2/2010 Brumels
7,768,775 B2 8/2010 Kim
D635,614 S 4/2011 Yan
D637,594 S 5/2011 Carpenter et al.
D639,800 S 6/2011 Magruder
7,965,039 B2 6/2011 Watanabe et al.
7,985,139 B2 7/2011 Lind et al.
8,006,435 B2 8/2011 DeBlonk et al.
8,016,452 B2 9/2011 Dunn
D646,269 S 10/2011 Crick, Jr. et al.
D653,662 S 2/2012 Park et al.
D654,116 S 2/2012 McDougall et al.
8,116,081 B2 2/2012 Crick, Jr.
D657,421 S 4/2012 Yan
D657,422 S 4/2012 Yan
D659,259 S 5/2012 Duddy
D662,040 S 6/2012 Yang et al.
D662,329 S 6/2012 Arko et al.
D665,029 S 8/2012 Krapf et al.
D669,938 S 10/2012 Lard et al.
D671,885 S 12/2012 Steinau
8,418,387 B2 4/2013 Swatt et al.
8,537,302 B2 9/2013 Dunn
D696,658 S 12/2013 Winston et al.
8,616,447 B2 12/2013 Bianco
D700,901 S 3/2014 Giglio et al.
D704,265 S 5/2014 Yan
D708,573 S 7/2014 Gieniec et al.
D710,298 S 8/2014 Jie et al.
D712,367 S 9/2014 Park et al.
8,819,968 B1 9/2014 Van Beek
8,895,836 B2 11/2014 Amin et al.
D719,120 S 12/2014 Park et al.
8,919,778 B2 12/2014 Fodera
D730,858 S 6/2015 Yoon et al.
D731,189 S 6/2015 Kim et al.
D734,074 S 7/2015 Jouin
D734,965 S 7/2015 Tio et al.
D739,464 S 9/2015 Liu et al.
9,121,391 B1 9/2015 Koehler, III
D740,966 S 10/2015 Indio da Costa et al.
D747,816 S 1/2016 Indio da Costa et al.
9,235,232 B2 1/2016 King
D752,529 S 3/2016 Loretan et al.
9,282,676 B1 3/2016 Diaz
D754,256 S 4/2016 Maman et al.
9,313,447 B2 4/2016 Dunn et al.
9,317,060 B2 4/2016 Dunn et al.
D761,221 S 7/2016 Kim et al.
D775,622 S 1/2017 Fu et al.
D776,651 S 1/2017 Yates
D777,695 S 1/2017 Odryna et al.
D786,453 S 5/2017 Indio da Costa et al.
D786,454 S 5/2017 Indio da Costa et al.
9,655,289 B2 5/2017 Dunn et al.
D789,313 S 6/2017 Jacobi
D791,069 S 7/2017 Mota et al.
9,703,320 B2 7/2017 Bowers et al.
D795,453 S 8/2017 Indio da Costa et al.
9,723,765 B2 8/2017 DeMars et al.
D797,658 S 9/2017 Feller et al.
9,756,739 B2 9/2017 Russell-Clarke et al.
D804,054 S 11/2017 Indio da Costa et al.
9,823,690 B2 11/2017 Bowers et al.
D806,895 S 1/2018 Terashima et al.
D807,840 S 1/2018 Lee et al.
9,857,618 B2 1/2018 Barnes
9,861,007 B2 1/2018 Yoon et al.
D812,384 S 3/2018 Zhu
D813,802 S 3/2018 Krantz et al.
D816,624 S 5/2018 Odryna et al.
D817,288 S 5/2018 Won et al.
D820,798 S 6/2018 Yurusov

(56) References Cited

U.S. PATENT DOCUMENTS

| | | | |
|---|---|---|---|
| D831,599 S | 10/2018 | Chong et al. | |
| 10,143,106 B2 | 11/2018 | Diaz | |
| D835,926 S | 12/2018 | Abatemarco, Jr. | |
| D839,352 S | 1/2019 | Lim et al. | |
| 10,191,212 B2 | 1/2019 | Dunn | |
| 10,194,564 B2 | 1/2019 | Dunn et al. | |
| 10,212,845 B2 | 2/2019 | Dunn et al. | |
| 10,278,311 B2 | 4/2019 | DeMars | |
| 10,290,243 B2 | 5/2019 | Lanham | |
| D852,274 S | 6/2019 | Lim et al. | |
| D856,530 S | 8/2019 | Oskoui | |
| 10,398,058 B2 | 8/2019 | Diaz | |
| 10,401,016 B2 | 9/2019 | Coo | |
| D861,623 S | 10/2019 | Odryna et al. | |
| D864,958 S * | 10/2019 | Yüksek | D14/349 |
| 10,485,147 B2 | 11/2019 | Oh et al. | |
| D869,412 S | 12/2019 | Spencer et al. | |
| D879,202 S | 3/2020 | Hornsby et al. | |
| 10,578,658 B2 | 3/2020 | Dunn et al. | |
| 10,602,626 B2 | 3/2020 | Dunn | |
| D883,278 S | 5/2020 | Yepez et al. | |
| D885,382 S | 5/2020 | Kim et al. | |
| D886,096 S | 6/2020 | Mangeot | |
| D890,710 S | 7/2020 | Bakshi | |
| 10,716,224 B2 | 7/2020 | Dunn et al. | |
| 10,757,844 B2 | 8/2020 | Dunn et al. | |
| D900,221 S | 10/2020 | Dance | |
| 10,820,445 B2 | 10/2020 | Diaz | |
| 10,827,644 B2 | 11/2020 | Diaz | |
| 10,827,657 B2 | 11/2020 | Lee | |
| 10,831,050 B2 | 11/2020 | Dunn et al. | |
| 10,844,995 B1 | 11/2020 | Wang et al. | |
| 10,925,174 B2 | 2/2021 | Dunn et al. | |
| D913,276 S | 3/2021 | Dunn | |
| D913,277 S | 3/2021 | Dunn | |
| D913,278 S | 3/2021 | Dunn | |
| D916,189 S | 4/2021 | Dunn | |
| D916,190 S | 4/2021 | Dunn | |
| D916,319 S | 4/2021 | Dunn | |
| D916,971 S | 4/2021 | Dunn | |
| D916,972 S | 4/2021 | Dunn | |
| D916,973 S | 4/2021 | Dunn | |
| D916,974 S | 4/2021 | Dunn | |
| D916,975 S | 4/2021 | Dunn | |
| D916,976 S | 4/2021 | Dunn | |
| D916,977 S | 4/2021 | Dunn | |
| 10,999,941 B2 | 5/2021 | Dunn | |
| D924,187 S | 7/2021 | Park et al. | |
| D927,595 S | 8/2021 | Ogden et al. | |
| D931,663 S | 9/2021 | Tio et al. | |
| 11,117,482 B2 | 9/2021 | Mercer et al. | |
| D934,159 S | 10/2021 | Dunn et al. | |
| 11,148,621 B2 | 10/2021 | Dunn et al. | |
| D935,426 S | 11/2021 | Stinson et al. | |
| 11,206,750 B2 | 12/2021 | Lee et al. | |
| D941,235 S | 1/2022 | Dunn et al. | |
| D941,236 S | 1/2022 | Dunn et al. | |
| D948,499 S | 4/2022 | Inouye et al. | |
| D949,972 S | 4/2022 | Lee et al. | |
| D957,317 S | 7/2022 | Dunn | |
| D958,059 S | 7/2022 | Dunn | |
| D961,944 S | 8/2022 | Shen | |
| D964,920 S | 9/2022 | Dunn | |
| 11,477,923 B2 | 10/2022 | Brown | |
| D969,066 S | 11/2022 | Dunn | |
| D969,067 S | 11/2022 | Dunn | |
| D969,068 S | 11/2022 | Dunn | |
| 11,496,091 B2 | 11/2022 | Dunn et al. | |
| D971,865 S | 12/2022 | Kim et al. | |
| D971,915 S | 12/2022 | Cho et al. | |
| D989,018 S | 6/2023 | Kim et al. | |
| D993,909 S | 8/2023 | Dunn | |
| 11,762,231 B2 | 9/2023 | Dunn et al. | |
| 2001/0032404 A1 | 10/2001 | Hillstrom | |
| 2001/0043290 A1 | 11/2001 | Yamamoto | |
| 2001/0043293 A1 | 11/2001 | Inoue | |
| 2002/0009978 A1 | 1/2002 | Dukach et al. | |
| 2002/0149714 A1 | 10/2002 | Anderson et al. | |
| 2003/0039094 A1 | 2/2003 | Sarkinen et al. | |
| 2004/0025389 A1 | 2/2004 | Peterson | |
| 2004/0103570 A1 | 6/2004 | Ruttenberg | |
| 2004/0212548 A1 | 10/2004 | Ruttenberg | |
| 2004/0257492 A1 | 12/2004 | Mai et al. | |
| 2005/0105178 A1 | 5/2005 | Kim | |
| 2005/0127796 A1 | 6/2005 | Olesen et al. | |
| 2006/0012985 A1 | 1/2006 | Archie, Jr. et al. | |
| 2006/0077636 A1 | 4/2006 | Kim | |
| 2006/0137294 A1 | 6/2006 | Waits et al. | |
| 2006/0215421 A1 | 9/2006 | Chang et al. | |
| 2006/0218828 A1 | 10/2006 | Schrimpf et al. | |
| 2007/0021217 A1 | 1/2007 | Wu | |
| 2007/0070615 A1 | 3/2007 | Joslin et al. | |
| 2007/0139574 A1 | 6/2007 | Ko et al. | |
| 2007/0253205 A1 | 11/2007 | Welker | |
| 2007/0268234 A1 | 11/2007 | Wakabayashi et al. | |
| 2008/0002350 A1 | 1/2008 | Farrugia | |
| 2008/0054144 A1 | 3/2008 | Wohlford | |
| 2008/0100186 A1 | 5/2008 | Li | |
| 2008/0174456 A1 | 7/2008 | Warren | |
| 2008/0236005 A1 | 10/2008 | Isayev et al. | |
| 2008/0255901 A1 | 10/2008 | Carroll et al. | |
| 2008/0276507 A1 | 11/2008 | Hines | |
| 2008/0298051 A1 | 12/2008 | Chu | |
| 2008/0304219 A1 | 12/2008 | Chen | |
| 2009/0009041 A1 | 1/2009 | Zeidler | |
| 2009/0016004 A1 | 1/2009 | McCoy | |
| 2009/0050194 A1 | 2/2009 | Noble et al. | |
| 2009/0104989 A1 | 4/2009 | Williams et al. | |
| 2009/0126906 A1 | 5/2009 | Dunn | |
| 2009/0126907 A1 * | 5/2009 | Dunn | H05K 7/20972 165/104.31 |
| 2009/0141199 A1 | 6/2009 | Fujikawa | |
| 2009/0183405 A1 | 7/2009 | Wilkes | |
| 2009/0231807 A1 | 9/2009 | Bouissiere | |
| 2009/0241388 A1 | 10/2009 | Dunn | |
| 2009/0241437 A1 | 10/2009 | Steinle et al. | |
| 2009/0278007 A1 | 11/2009 | Taylor | |
| 2009/0279240 A1 | 11/2009 | Karppanen | |
| 2010/0079949 A1 | 4/2010 | Nakamichi et al. | |
| 2010/0079979 A1 | 4/2010 | Nakamichi et al. | |
| 2010/0171889 A1 | 7/2010 | Pantel et al. | |
| 2010/0220249 A1 | 9/2010 | Nakamichi et al. | |
| 2010/0226091 A1 | 9/2010 | Dunn | |
| 2011/0019348 A1 | 1/2011 | Kludt et al. | |
| 2011/0051071 A1 | 3/2011 | Nakamichi et al. | |
| 2011/0075363 A1 | 3/2011 | Nakamichi et al. | |
| 2011/0090630 A1 | 4/2011 | Bergeron et al. | |
| 2011/0114384 A1 | 5/2011 | Sakamoto et al. | |
| 2011/0116000 A1 | 5/2011 | Dunn et al. | |
| 2011/0116231 A1 | 5/2011 | Dunn et al. | |
| 2011/0134356 A1 | 6/2011 | Swatt et al. | |
| 2011/0141672 A1 | 6/2011 | Farley, Jr. et al. | |
| 2011/0227467 A1 | 9/2011 | Foppe, Jr. et al. | |
| 2011/0297810 A1 | 12/2011 | Tachibana | |
| 2011/0298841 A1 | 12/2011 | Fujimori | |
| 2012/0050958 A1 | 3/2012 | Sanford et al. | |
| 2012/0105424 A1 | 5/2012 | Lee et al. | |
| 2012/0162878 A1 * | 6/2012 | Fukuma | F16M 11/00 361/679.01 |
| 2012/0224116 A1 | 9/2012 | Barnes | |
| 2012/0253672 A1 | 10/2012 | Hoshino et al. | |
| 2012/0255721 A1 | 10/2012 | Kim et al. | |
| 2013/0033222 A1 | 2/2013 | Hixson et al. | |
| 2013/0211583 A1 | 8/2013 | Borra | |
| 2013/0270975 A1 | 10/2013 | Dunn et al. | |
| 2013/0294039 A1 | 11/2013 | Chao | |
| 2013/0329363 A1 | 12/2013 | Dunn et al. | |
| 2014/0044147 A1 | 2/2014 | Wyatt et al. | |
| 2014/0055914 A1 | 2/2014 | Fournier | |
| 2014/0208626 A1 | 7/2014 | Moon | |
| 2014/0313666 A1 | 10/2014 | Chin | |
| 2014/0334100 A1 | 11/2014 | Yoon et al. | |
| 2015/0009627 A1 | 1/2015 | Dunn et al. | |
| 2015/0194561 A1 | 7/2015 | Toya et al. | |

(56) References Cited

U.S. PATENT DOCUMENTS

| | | | | |
|---|---|---|---|---|
| 2015/0211676 | A1 | 7/2015 | Martin et al. | |
| 2015/0264826 | A1 | 9/2015 | Dunn et al. | |
| 2015/0381922 | A1 | 12/2015 | Hamilton | |
| 2016/0132849 | A1 | 5/2016 | Melo et al. | |
| 2016/0192536 | A1 | 6/2016 | Diaz | |
| 2016/0242329 | A1 | 8/2016 | DeMars | |
| 2017/0040789 | A1 | 2/2017 | Bonilla et al. | |
| 2017/0074453 | A1 | 3/2017 | Bowers et al. | |
| 2017/0083043 | A1 | 3/2017 | Bowers et al. | |
| 2017/0231112 | A1 | 8/2017 | Dunn et al. | |
| 2017/0345346 | A1 | 11/2017 | Hong et al. | |
| 2018/0272959 | A1* | 9/2018 | Hornsby | B60R 11/0235 |
| 2018/0293921 | A1 | 10/2018 | Margrill | |
| 2018/0315356 | A1 | 11/2018 | Dunn et al. | |
| 2018/0317330 | A1* | 11/2018 | Dunn | G09F 13/0445 |
| 2018/0317350 | A1 | 11/2018 | Dunn et al. | |
| 2018/0345809 | A1 | 12/2018 | Derrien et al. | |
| 2019/0059175 | A1 | 2/2019 | Diaz | |
| 2019/0239365 | A1 | 8/2019 | Dunn et al. | |
| 2019/0289754 | A1 | 9/2019 | Hubbard | |
| 2019/0335613 | A1 | 10/2019 | Diaz | |
| 2020/0037456 | A1 | 1/2020 | Dunn | |
| 2020/0163234 | A1 | 5/2020 | Dunn | |
| 2020/0288585 | A1 | 9/2020 | Dunn et al. | |
| 2020/0383246 | A1 | 12/2020 | Lee | |
| 2021/0066923 | A1 | 3/2021 | Dunn et al. | |
| 2021/0168949 | A1 | 6/2021 | Dunn et al. | |
| 2021/0304644 | A1 | 9/2021 | Webster | |
| 2021/0313927 | A1* | 10/2021 | Dunn | G09F 27/007 |
| 2022/0035198 | A1 | 2/2022 | Dunn et al. | |
| 2023/0164964 | A1 | 5/2023 | Dunn et al. | |

FOREIGN PATENT DOCUMENTS

| | | | | | |
|---|---|---|---|---|---|
| CA | 2780884 | C | | 4/2019 | |
| CA | 2942321 | C | | 6/2022 | |
| CN | 206610564 | U | | 11/2017 | |
| CN | 213183232 | U | | 5/2021 | |
| CN | 214171740 | U | | 9/2021 | |
| CN | 219317994 | U | | 7/2023 | |
| EM | 008035232-0001 | | | 7/2020 | |
| EP | 3468321 | A1 | | 4/2019 | |
| EP | 3117693 | B1 | | 8/2019 | |
| EP | 3468321 | B1 | | 4/2021 | |
| EP | 3830464 | A1 | | 6/2021 | |
| EP | 4022595 | A1 | | 7/2022 | |
| GB | 153110 | | | 11/1920 | |
| GB | 2483703 | A | * | 3/2012 | G09F 21/04 |
| JP | 2005292939 | A | | 10/2005 | |
| JP | 2005332253 | A | | 12/2005 | |
| JP | 2006198344 | A | | 8/2006 | |
| JP | 2009044262 | A | * | 2/2009 | |
| KR | 200163508 | Y1 | | 7/2000 | |
| KR | 200206768 | Y1 | | 12/2000 | |
| KR | 200236278 | Y1 | | 10/2001 | |
| KR | 2002-0057425 | A | | 7/2002 | |
| KR | 200286961 | Y1 | | 8/2002 | |
| KR | 200366674 | Y1 | | 11/2004 | |
| KR | 300422537.0000 | | | 8/2006 | |
| KR | 30-0606958 | S | | 7/2011 | |
| KR | 10-1444022 | B1 | | 10/2014 | |
| KR | 10-2379046 | B1 | | 3/2022 | |
| WO | WO2011059793 | A2 | | 5/2011 | |
| WO | WO2012006620 | A2 | | 1/2012 | |
| WO | 2012/035362 | A1 | | 3/2012 | |
| WO | 2015138609 | A2 | | 9/2015 | |
| WO | 2016/102980 | A1 | | 6/2016 | |
| WO | 2016102980 | A1 | | 6/2016 | |
| WO | D098725-001 | | | 12/2017 | |
| WO | 2020028045 | A1 | | 2/2020 | |
| WO | 2021/041381 | A1 | | 3/2021 | |

OTHER PUBLICATIONS

The Free Dictionary, Screw—Definition of screw by The Free Dictionary, Jun. 15, 2016, 1 Page.
I-Tech Company, 65" Outdoor Digital Signage Sunlight All Weather Proof LCD, 1 Page.
sunlightlcd.com, 46" All Weather NEMA4 Outdoor High Brightness (Model: GS4600L), Mar. 11, 2009, 2 Pages.
Vertigo Digital Displays, Innovation on Display FlexVu Totem Brochure, 2014, 6 pages.
Vertigo Digital Displays, FlexVu Totem Shelter, 2017, 2 pages.
Vertigo Digital Displays, All Products Catalogue, 2017,14 pages.
Adnation,Turn Key Advertising Technology Solutions, May 23, 2017, 4 pages.
Civiq Smartscapes, FlexVue Ferro 55P/55L, Mar. 16, 2017, 4 pages.
Civiq, Invalidity Contentions, Jan. 24, 2018, 51 pages.
Civiq, Invalidity Claim Chart, Appendix E, Jan. 24, 2018, 28 pages.
Civiq, Invalidity Claim Chart, Appendix I, Mar. 22, 2018, 4 pages.
Civiq, Smart City Devices, webpage, Jan. 30, 2019, 5 pages.
Civiq, Smart City Platform, webpage, Jan. 30, 2019, 10 pages.
Civiq, Smartscapes devices, webpage, Jan. 30, 2019, 1 page.
Miller, Adnation, photos, May 9, 2017, 28 pages.
Civiq Smartscapes, There are companies that make kiosks. And then there's CIVIQ.—Advanced Smart City Platform, webpage, Jan. 30, 2019, 10 pages.
Civiq Smartscapes, Connecting people, places & experiences, webpage, Jan. 30, 2019, 5 pages.
Civiq Smartscapes, Connecting people, places & experiences, screen shot of devices webpage, Jan. 30, 2019, 1 page.
Melford Technologies, Part 1, video online at https://m.youtube.com/watch?v=OAV7zzVrHtE&feature=youtu.be, Oct. 21, 2019, 1 page.
Manufacturing Resources International, Manufacturing Resources International home webpage, Nov. 4, 2019, 2 pages.
Manufacturing Resources International, LCD Display Deployments webpage, Nov. 4, 2019, 3 pages.
Manufacturing Resources International, BoldVu Outdoor LCD Display webpage, Nov. 4, 2019, 2 pages.
Manufacturing Resources International, BoldVu Semi Outdoor LCD Display webpage, Nov. 8, 2019, 2 pages.
Manufacturing Resources International, BoldVu Vehicle Top LCD Display webpage, Nov. 8, 2019, 2 pages.
Manufacturing Resources International, Drivethru Menu Boards Webpage, Nov. 8, 2019, 2 pages.
Manufacturing Resources International, Storefront Digital Signage webpage, Nov. 8, 2019, 2 pages.
Gable, Blog Post: The Anatomy of an Interactive Kiosk, Aug. 15, 2018, 4 pages.

* cited by examiner

DISPLAY ASSEMBLY WITH UNOBSTRUCTED ZONE

CROSS-REFERENCE TO RELATED APPLICATIONS

This application is filed as original and makes no priority claim.

TECHNICAL FIELD

Exemplary embodiments relate generally to display assemblies with at least one unobstructed zone, as well as systems and methods for the same.

BACKGROUND AND SUMMARY OF THE INVENTION

The demand for digital out of home ("DOOH") advertising units has grown significantly in recent years. It is known to provide electronic displays in ruggedized housings for outdoor placement. Where such units are configured for mounting to a sidewalk or other ground surface, they are typically provided as a monolithic structure. Such units generally include one or more elevated electronic displays and a closed, lower or upper cavity, thereby presenting an unbroken, or substantially unbroken, exterior. The elevated nature of the electronic displays permits an ergonomic viewing height and may confirm to various regulations or other rules, such as the Americans with Disabilities Act. The monolithic structure approach presents a seamless appearance, permits storage of sensitive electronic equipment, wiring, mounting, or other components within the upper or lower cavities, which may permit cooling, powering, and/or network connectivity of the same and/or enhance structural integrity, by way of non-limiting example.

A display assembly is disclosed having one or more unstructured zones. For a variety of reasons, it may be desirable to leave one or more portions of the units unobstructed. For example, this may permit viewing through and beyond the units, such as to make other people, cars, or the like, visible on the other side of the unit. This may improve pedestrian safety. This may increase aerodynamics, improving structural resistance to forces such as strong winds. This may increase airflow, such as by providing unobstructed zones near intakes and/or exhausts, such as for thermal management needs. This may increase clearance for radio signals, such as to improve transmission/reception of the same. These are some non-limiting examples.

In exemplary embodiments, without limitation, one or more side assemblies, each comprising at least one electronic display, are mounted to a framework. One or more side assemblies may be utilized. For example, without limitation, two side assemblies may be provided on opposing sides of the framework, such as in a back-to-back orientation. The side assemblies may be mounted for movement relative to the framework, such as to permit access to the side assemblies and/or an interior compartment.

The side assemblies may be mounted in an elevated position such that the unobstructed zone extends below the side assemblies, by way of non-limiting example. Wiring, such as for power, network connectivity, combinations thereof, or the like, may extend within or along one or more members of the framework, such as to the side assemblies and/or an internal compartment located between the side assemblies of a given unit. Alternatively, or additionally, certain electronic components may be mounted to the one or more member(s) of the framework which are covered with cladding so as to preserve the unobstructed zone. In this fashion, the units may be powered and/or connected to a network while preserving the unobstructed zone(s) and shielding the sensitive components (e.g., wiring, electronic components) from harsh weather, vandalism, or the like.

One or more support members may extend from the framework to the side assemblies, such as to suspend the side assemblies within the framework at the elevated position. This may provide additional unobstructed zones, such as along left, right, and/or upper sides of the side assemblies. Wiring or other components may be provided within such support member(s).

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
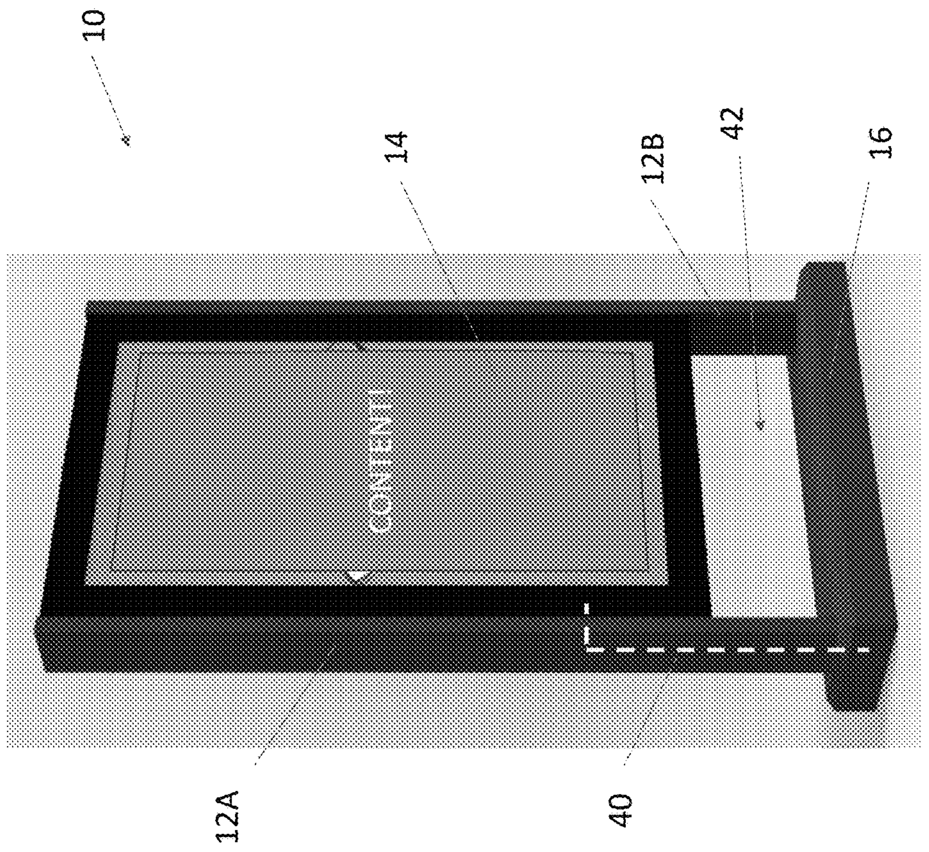
FIG. 1 is a perspective view of a display assembly with an unobstructed zone.

FIG. 1 illustrates an exemplary display assembly 10. The assembly 10 may comprise a framework 12. The framework 12 may comprise multiple members. The members may be constructed of steel, aluminum, an alloy, combinations thereof, or the like. Some of the members may extend substantially upward (e.g., vertically) and others may extend substantially laterally (e.g., horizontally). However, any number, size, shape, type, and/or orientation of members may be utilized to form any size and/or shape framework 12. In exemplary embodiments, a first member 12A and a second member 12B may extend in a generally upward direction from a base 16. The first and second members 12A, 12B may be spaced apart from one another, such as to accommodate one or more side assemblies 14.

The base 16 may be configured for mounting to a sidewalk, parking lot, or other ground surface. The base 16 may extend between members of the framework 12, such as the first and second members 12A, 12B. The base 16 may extend laterally and/or horizontally.

Figure 2:
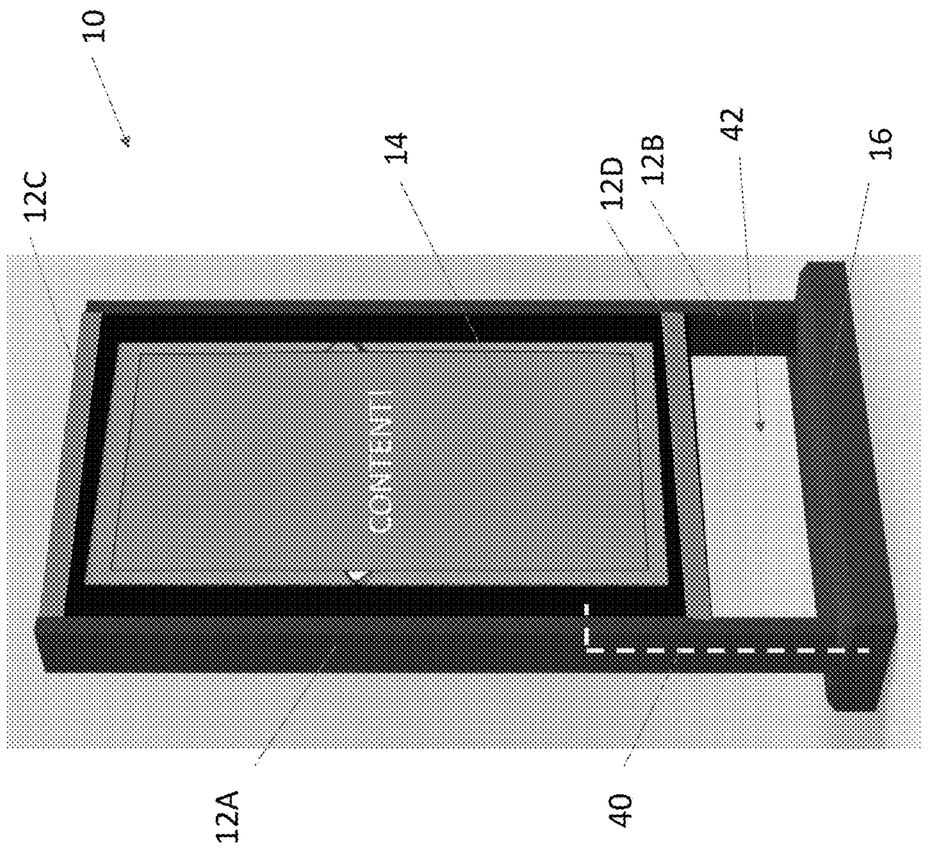
FIG. 2 is a perspective view of another exemplary display assembly with an unobstructed zone.

As illustrated with particular regard to at least FIG. 2 the framework 12 may comprise a third member 12C and a fourth member 12D. The third member 12C and the fourth member 12D may each extend between the first member 12A and the second member 12B in exemplary embodiments, without limitation. The third and fourth members 12C, 12D may be spaced apart from one another, such as to accommodate the one or more side assemblies 14.

The side assemblies 14 (sometimes also referred to as display subassemblies and/or electronic display subassemblies) may be positioned such that front surfaces are flush, or substantially flush, with the third and/or fourth members 12C, 12D. Alternatively, the display subassemblies 14 may be positioned such that the front surfaces are recessed relative to the third and/or fourth members 12C, 12D.

One or more side assemblies 14 may be connected to said framework 12. A first and second electronic display subassembly 14 may be mounted to a given framework 12 in opposing directions, such as in a back-to-back arrangement by way of non-limiting example. Each of the display subassemblies 14 may comprise one or more electronic displays. The side assemblies 14 may comprise BOLDVU® displays available from Manufacturing Resources International, Inc. of Alpharetta, Georgia (https://mri-inc.net/) by way of non-limiting example. The side assemblies 14 may, separately and/or when made part of the assemblies 10, include technology and/or components shown and/or described in one or more of: U.S. Pat. No. 8,373,841 issued Feb. 12, 2013, U.S. Pat. No. 8,351,014 issued Jan. 8, 2013, U.S. Pat. No. 10,398,066 issued Aug. 27, 2019, and/or 10,499,516 issued Dec. 3, 2019, by way of non-limiting examples, the disclosures of each of which are hereby incorporated by reference.

Figure 3B:
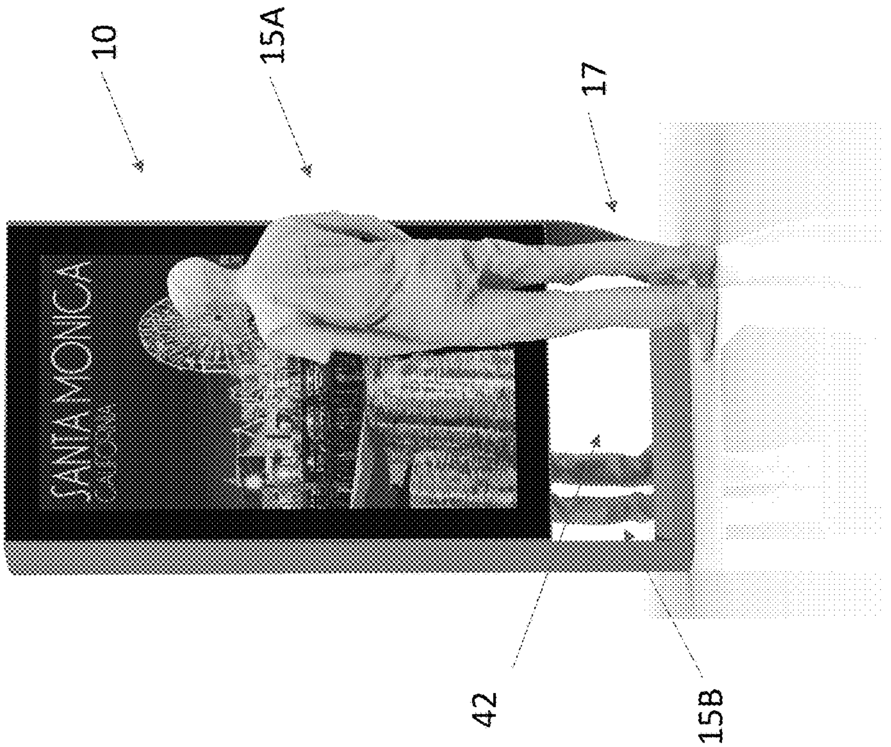
FIG. 3B is a perspective view of the display assembly of FIG. 3A in exemplary use with two users.

In exemplary embodiments, without limitation, the side assemblies 14 may be mounted to same framework 12 in an elevated position above a ground surface. This may leave an unobstructed zone 42 within the framework 12, such as below the side assemblies 14 and above a ground surface and/or the base 16. For example, without limitation, the unobstructed zone 42 may extend interior to the first and second members 12A, 12B, below the one or more side assemblies 14, and above the base 16. The unobstructed zone 42 may be entirely devoid of components, such that space through and beyond the assembly 10 is visible and/or ambient air (e.g., wind) is permitted to pass therethrough, in exemplary embodiments, without limitation. In exemplary embodiments, without limitation, the unobstructed zone 42 may extend along an entire lower surface of the subassemblies 14, though such is not necessarily required. An example of such a unit 10 in use is shown, by way of non-limiting example, in FIG. 3B which illustrates user 15A, 15B on different sides of the unit 10 visible, in part, through the unobstructed zone 42.

Wiring 40 may extend within or along one or more members of the framework 12. By way of non-limiting example, the wiring 40 may extend within and/or along one or both of the first and second members 12A, 12B. The wiring 40 may be covered, such as by one or more items of cladding by way of non-limiting example. The wiring 40 may alternatively, or additionally, be covered by tape, protective sheathing, conduit, combinations thereof, or the like. Alternatively, or additionally, the wiring 40 may be secured to one or more members of the framework 12 by tape, adhesive, cable ties, combinations thereof, or the like.

Alternatively, or additionally, the framework 12 may comprise one or more hollow members (e.g., first and second members 12A, 12B) to accommodate the wiring 40 traveling, at least in part, therethrough. Such hollow members may comprise steel tubing, by way of non-limiting example, and/or may comprise one or more apertures for the wiring 40 to enter and/or exit the members.

The wiring 40 may comprise power cables, data cables, combinations thereof, or the like. Any type, kind, and/or number of wires 40 may be utilized.

Figure 3A:
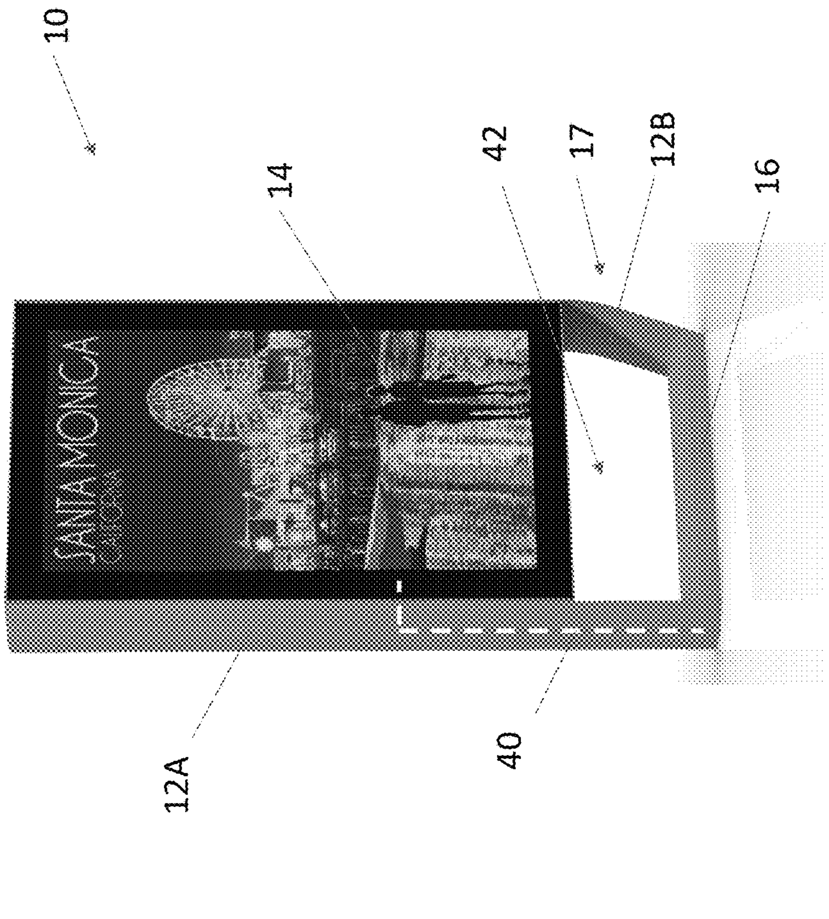
FIG. 3A is a perspective view of another exemplary display assembly with an unobstructed zone.
Figure 4:
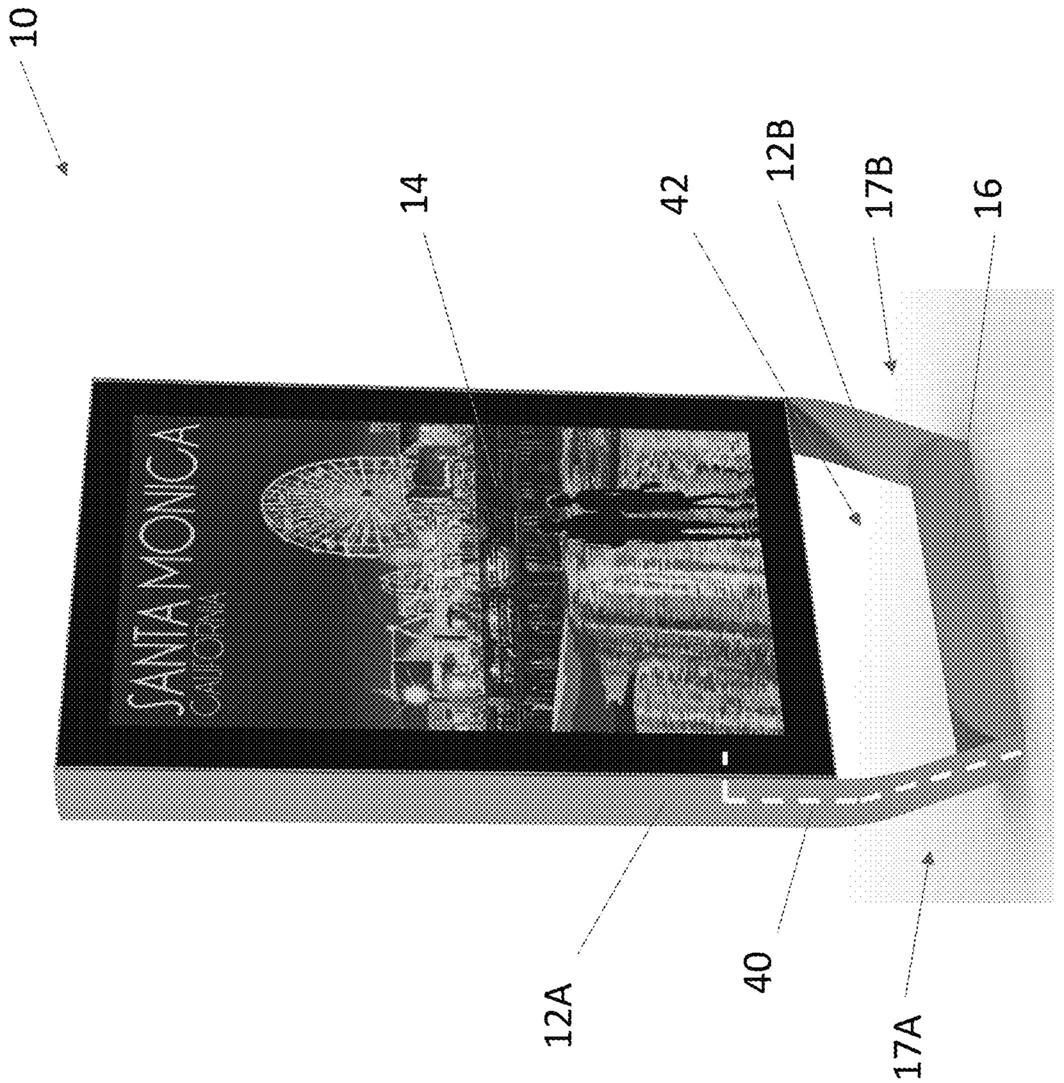
FIG. 4 is a perspective view of another exemplary display assembly with an unobstructed zone.

FIG. 3A through FIG. 4 illustrate additional exemplary embodiments of the assemblies 10 whereby one or more members of the framework 12 may comprise angled sections 17. For example, without limitation, one or both of the first and second members 12A, 12B may extend at a non-vertical angle (e.g., 45 degrees relative to horizontal), thereby reducing footprint of the base 16. In exemplary embodiments, without limitation, such angled sections 17 may be located between lower surfaces of the side assemblies 14 and the base 16. The units 10 may comprise a single angled section 17, or multiple angled sections 17A-17B. For example, without limitation, only one of the first and second members 12A, 12B may comprise the angled section 17, or both of the first and second members 12A, 12B may comprise one of the angled sections 17A, 17B.

Figure 5:
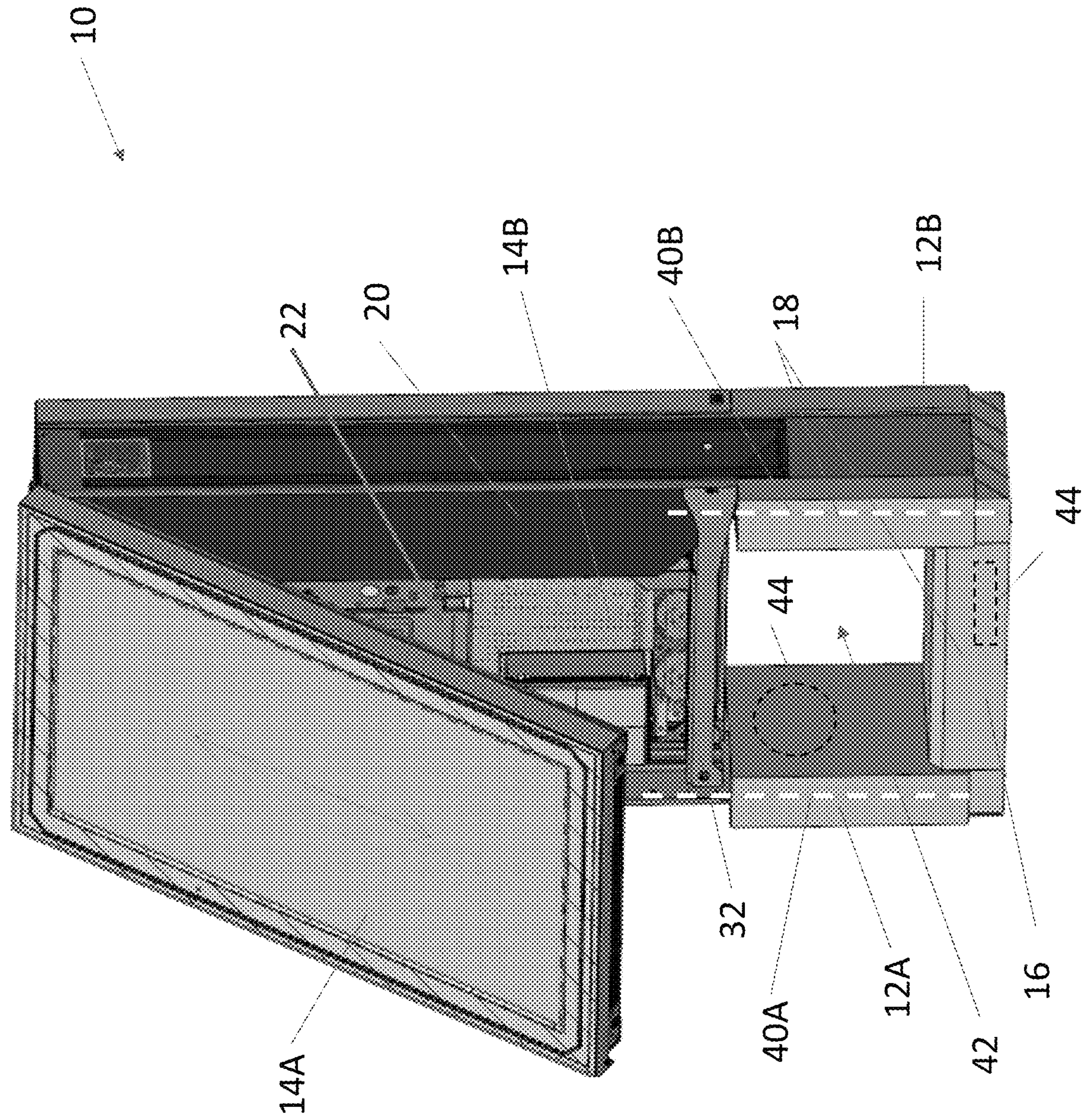
FIG. 5 is a perspective view of another exemplary display assembly with an unobstructed zone with one of the side assemblies in an opened position.

FIG. 5 illustrates another exemplary embodiment of the assembly 10. Certain electronic components 44 may be provided at or along one or more of the members of the framework 12. For example, without limitation, the electronic components 44 may be mounted to one or both of the first and second members 12A, 12B and/or the base 16. Such components 44 may be covered with one or more cladding panels 18. The cladding panels 18 may be attachable to the framework 12 by snap fit, fasteners, combinations thereof, or the like. Alternatively, or additionally, one or more members of the framework 12 may be fully or partially hollow to accommodate the electronic components 44.

Such electronic components 44 may comprise, for example, without limitation, power modules, media players, processors, electronic storage devices, electrical circuitry, bulk energy storage devices, sensors, electric vehicle (EV) charging equipment, network connectivity devices, combinations thereof, or the like. The assemblies 10 may comprise any type or kind of the electronic components 44 at any location or locations. For example, without limitation, the electronic components 44 may alternatively, or additionally, include cameras, air quality sensors, touch screens, telephones, audio and/or videoconferencing equipment, emergency signaling components, personal electronic changing adapters, ambient weather sensors, combinations thereof, or the like. At least some of the electronic components 44 may be provided within one or more compartments, such, as but not limited to, junction boxes, fully or partially sealed boxes, or the like, such as within the cladding 18.

The side assemblies 14 may be configured for movement between a closed position, such as where the side assembly 14 extends generally vertical and proximate to the framework 12, and an opened position, such as where a bottom portion of the side assembly 14 is rotated outward and away from the framework 12. The side assemblies 14 may be configured for rotation to approximately 38.5 degrees, by way of non-limiting example. Any amount or angle of rotation may be utilized, such as between 0 degrees and 90 degrees.

The same or different ones of the electronic components 44 may be mounted to rear surfaces of the side assemblies 14 and/or within an interior compartment 22 extending between the side assemblies 14. The interior compartment 22 may comprise ambient air (filtered or otherwise) and/or circulating gas.

One or more recessed compartments 20 may be provided, such as to provide space for customer facing portions of certain electronic equipment 44, such as, but not limited to, EV charging equipment (e.g., handles, adapters).

As illustrated with particular regard to FIG. 6A through FIG. 6F, the framework 12 may comprise one or more support members 26. The support members 26 may extend inward from other members of the framework 12, such as to support the side assemblies 14 within the framework 12. In this fashion, one or more additional unobstructed areas 42A, 42B, 42C may be provided along other sides of the side assemblies 14 (e.g., left, right, and top). Any number and arrangement of the support members 26 may be provided. The support members 26 may extend to some or all side edges of the side assemblies 14.

The wiring 40 may extend along and/or through one or more of the support members 26 to the side assemblies 14. The support members 26 may be hollow, by way of non-limiting example, though such is not required. Alternatively, or additionally, the wiring 40 may extend beneath tape, within sheathing or conduit, to name some non-limiting examples. Alternatively, or additionally, the wiring 40 may be secured to one or more of the support members 26 by tape, adhesive, cable ties, combinations thereof, or the like.

Opening 24, such as for ingestion and/or exhaustion of air from the units 10 (sometimes also referred to as intakes/exhausts), may be provided along one or more edges of the side assemblies 14, such as along an upper and lower edge thereof. The unobstructed zone 42 and/or at least one of the additional unobstructed zones 42B may be provided adjacent to such intakes/exhausts 2 in exemplary embodiments, without limitation, such as to provide clearance between the framework 12 and the side assemblies 14 to facilitate ingestion and/or exhaustion of air to/from the intakes/exhausts 24. One or more antennae 46A, 46B may be provided along one or more edges of the side assemblies 14, such as along an upper edge thereof. The unobstructed zone 42 and/or at least one of the additional unobstructed zones 42B may be provided adjacent to such antennae 46, in exemplary embodiments, without limitation, such as to provide clearance between the framework 12 and the side assemblies 14 to facilitate radio transmission to/from the antennae 46.

The assemblies 10 may comprise one or more mounting points 26. The mounting points 26 may comprise eyehooks, threaded holes, combinations thereof, or the like. Any number and/or arrangement of such mounting points 26 may be provided.

The assemblies 10 may comprise one or more locks 28. The locks 28 may be configured to selectively secure the side assemblies 14 in the closed positions, such as to prevent casual access, tampering, vandalism, or the like.

Movement assistance devices 38A, 38B, such as, but not limited to, gas struts, may extend between the framework 12 and the side assemblies 14, such as for assistance with moving or securing the side assemblies 14 in the opened and/or closed positions. Alternatively, or additionally, members for propping or otherwise securing the side assemblies 14 in the opened position may be provided.

Figure 6B:
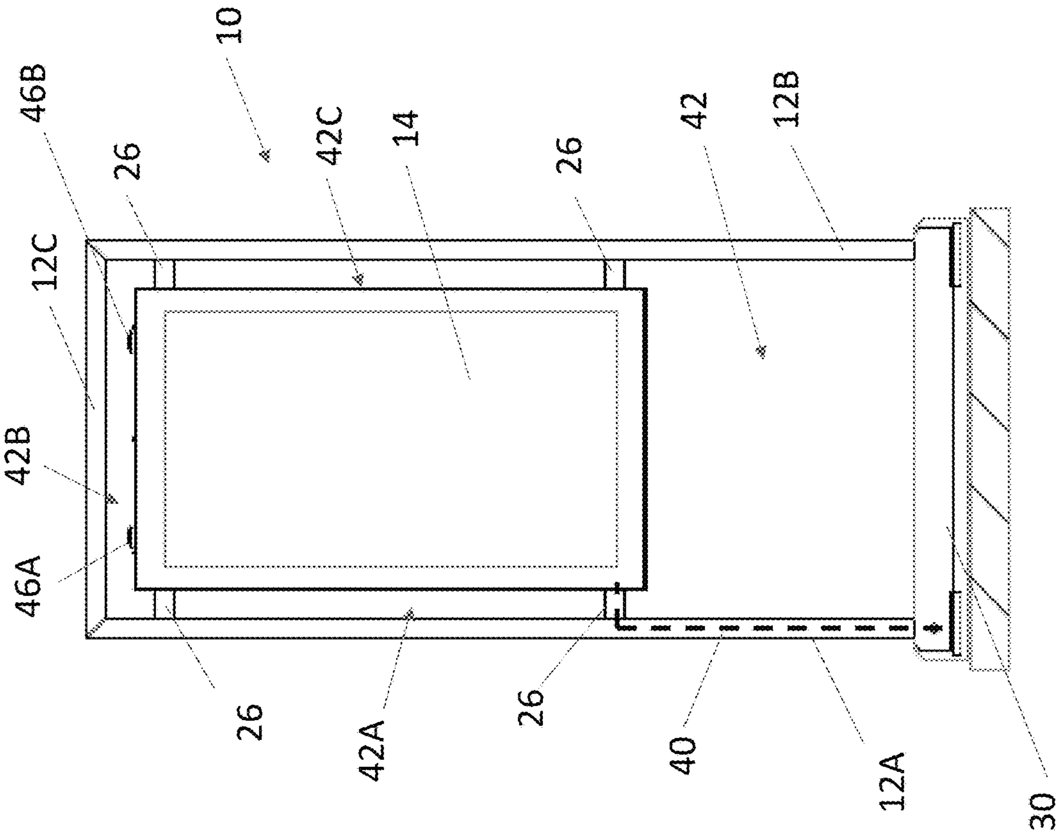
FIG. 6B is a front view of the unit of FIG. 6A.
Figure 6A:
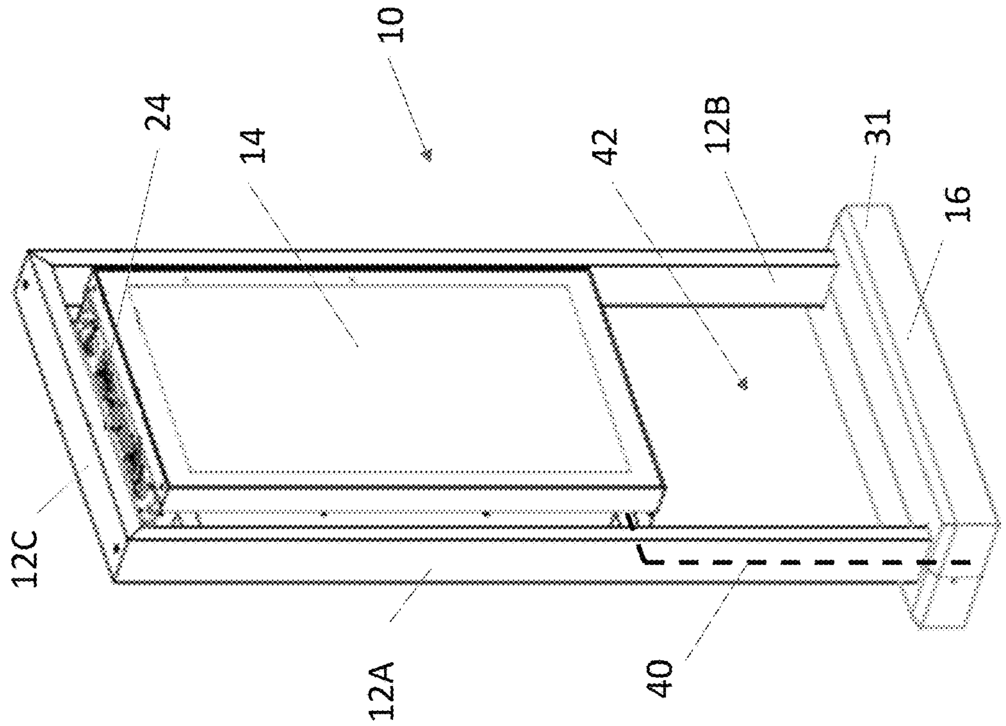
FIG. 6A is a perspective view of another exemplary display assembly with an unobstructed zone.
Figure 6C:
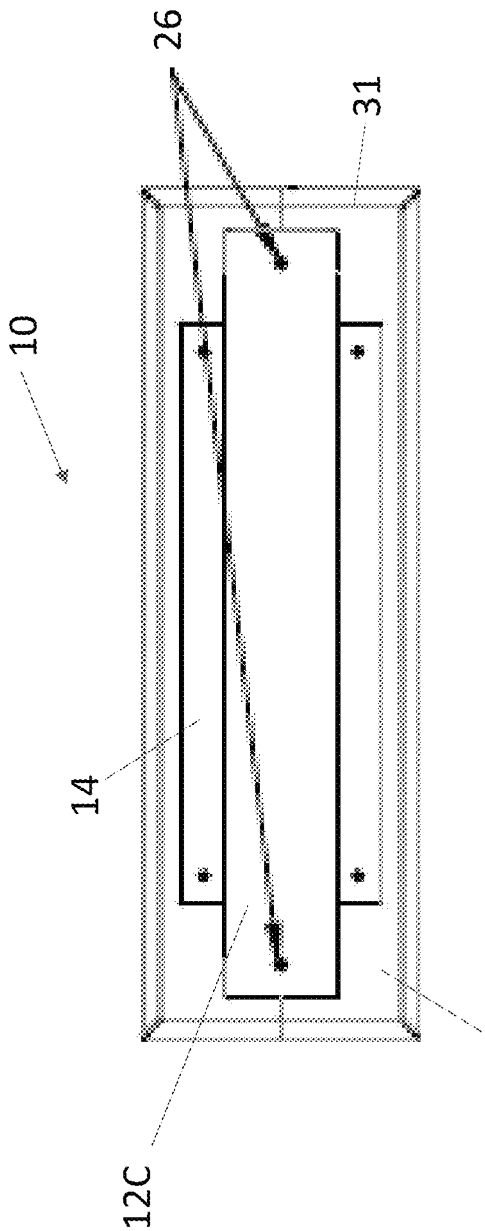
FIG. 6C is a top view of the unit of FIG. 6A.
Figure 6D:
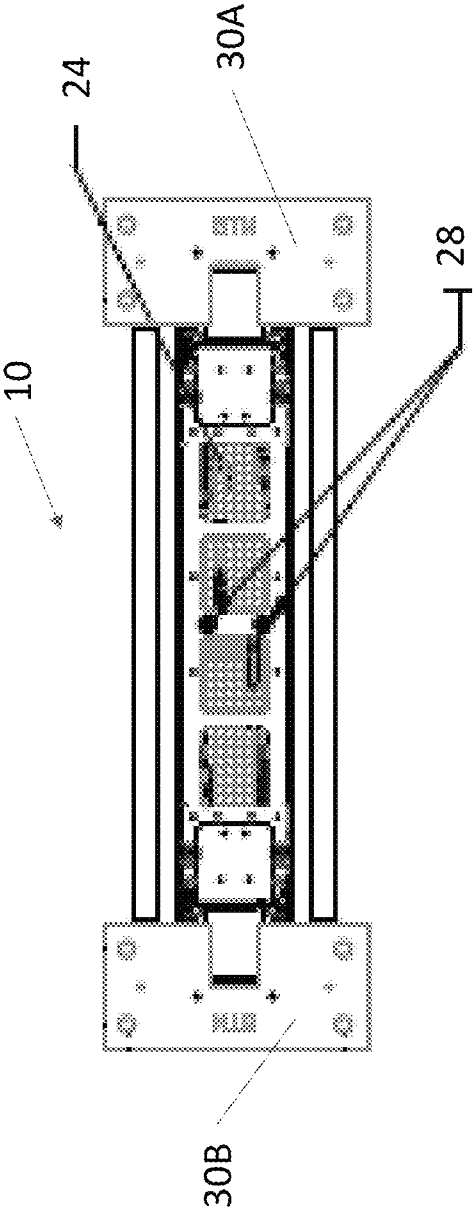
FIG. 6D is a bottom view of the unit of FIG. 6A.
Figure 6F:
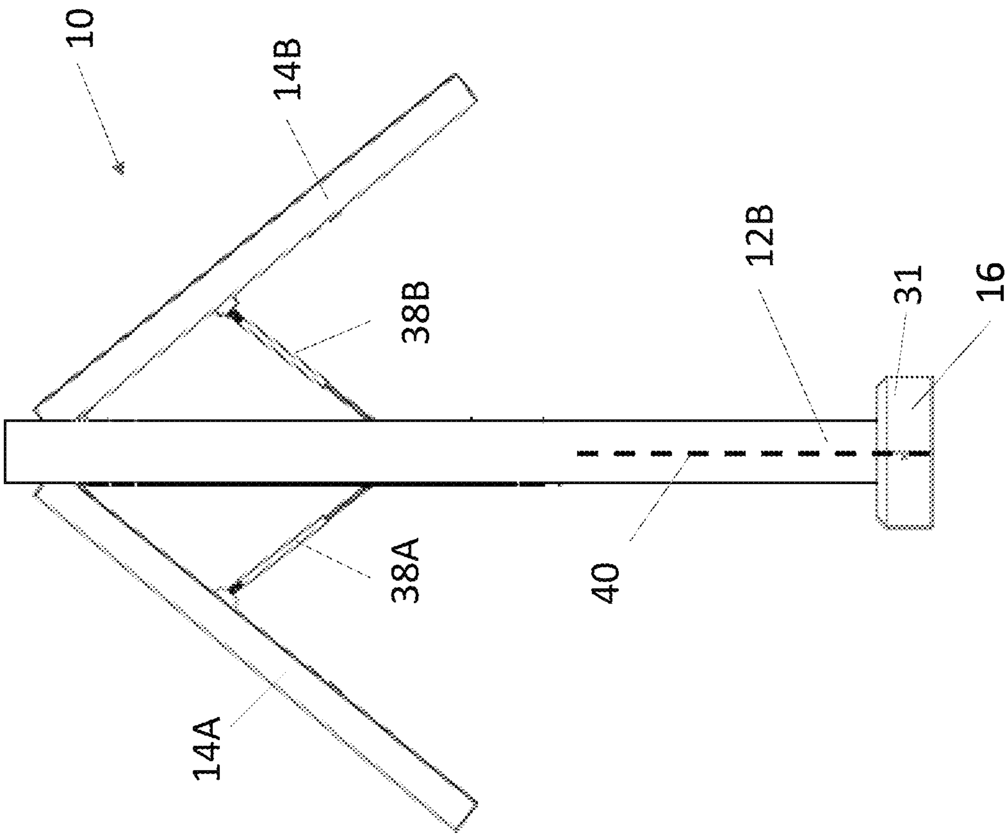
FIG. 6F is a left view of the unit of FIG. 6A with the side assemblies in opened positions.
Figure 6E:
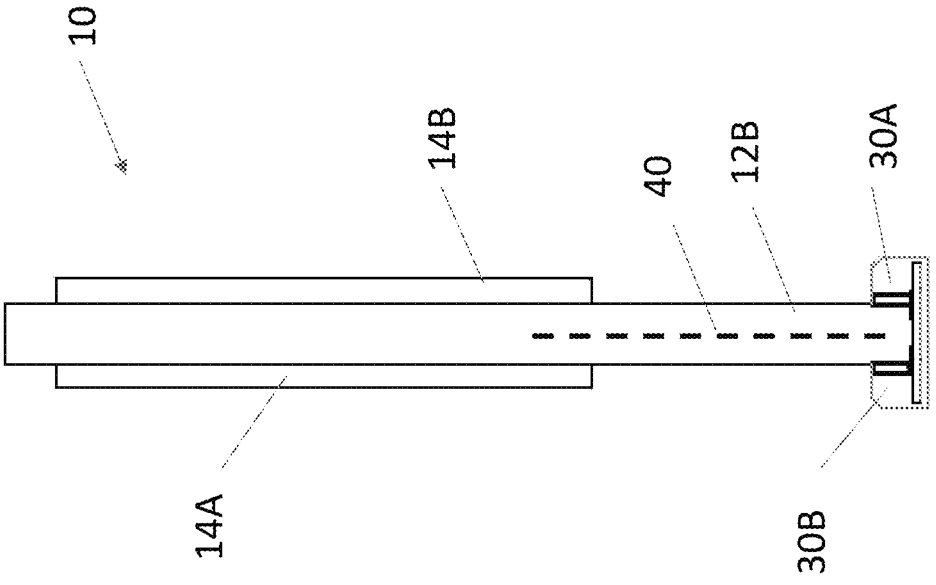
FIG. 6E is a left side view of the unit of FIG. 6A.

As illustrated with particular regard to at least FIGS. 6D-6E, the base 16 may comprise one or more stability elements 30A, 30B. The stability elements 30 may comprise members extending laterally, for example. This may provide space between such elements 30 for extending the wiring 40, mounting equipment (e.g., fasteners, nuts, washers, spacers, rubber grommets, combinations thereof, or the like), and/or placing electronic components 44 within the base 16. The base 16 may comprise one or more covers 31, cladding, or other panels, such as for securing over some or all of the stability elements 30 to disguise the same, along with the wiring 40, mounting equipment, and/or components 44.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

What is claimed is:

1. A display assembly comprising:

a framework comprising a base, a first member extending upward from said base, and a second member extending upward from said base at a position spaced apart from said first member;

an electronic display subassembly mounted to said framework at an elevated position above said base and between said first member and said second member, wherein said electronic display subassembly is mounted to a first side of said framework;

second electronic display subassembly mounted to a second side of said framework at the elevated position, wherein said second side of said framework is opposite said first side:

an interior compartment defined between said electronic display subassembly, said second electronic display assembly, and said framework; and electronic components for operating the electronic display subassembly located at said interior compartment, said electronic components comprising a power module and a media player:

wherein an unobstructed zone is formed within said framework and extends between a lower surface of said electronic display subassembly, a lower surface of said second electronic display subassembly, an upper surface of said base, an interior facing surface of said first member, and an interior facing surface of said second member.

2. The display assembly of claim 1 further comprising: wiring extending along or within at least a portion of said framework to said electronic display subassembly, wherein said wiring is configured to transmit electrical power and data.

3. The display assembly of claim 2 wherein: said wiring extends within at least a hollow part of one of said first member and said second member.

4. The display assembly of claim 2 further comprising: cladding attached to said at least one of said first member and said second member, wherein said wiring extends between said cladding and said at least one of said first member and said second member.

5. The display assembly of claim 4 further comprising: additional electronic components for operating the electronic display subassembly located between said cladding and said at least one of said first member and said second member.

6. The display assembly of claim 5 further comprising: a compartment located at said framework and holding a first portion of electric vehicle ("EV") charging equipment, wherein at least some of said electronic components comprise a second portion of said EV charging equipment.

7. The display assembly of claim 1 wherein:

said electronic display subassembly and said second electronic display subassembly are each configured for hinging movement relative to said framework between a closed position and an opened position; and said lower surface of said electronic display subassembly and said lower surface of said second electronic display subassembly are rotated outward and away from said framework when placed in said opened position.

8. The display assembly of claim 1 wherein: said framework comprises support members extending from interior faces of said first member and said second member to said electronic display subassembly and said second electronic display subassembly such that each of said electronic display subassembly and said second electronic display subassembly are spaced apart from said first member and said second member.

9. The display assembly of claim 8 wherein:

said framework comprises a laterally extending member extending between said first member and said second member; and said laterally extending member is located above and spaced apart from an upper surface of said electronic display subassembly.

10. The display assembly of claim 1 wherein: at least one of said first member and said second member comprises a non-vertical, non-horizontal, angled section located below the lower surface of said electronic display subassembly.

11. A display assembly comprising:

a framework comprising:

a base;

a first member extending upward from a first side of said base; and a second member extending upward from a second side of said base;

an electronic display subassembly moveably mounted to first member and said second member at an elevated position;

an entirely unobstructed zone extending below a lower edge of said electronic display subassembly, above said base, and between said first member and said second member;

wiring extending within or along at least one of said first member and said second member; and stabilizing members extending between said first member and said electronic display subassembly and between said second member and said electronic display subassembly.

12. The display assembly of claim 11 further comprising:

electronic components for operating the electronic display subassembly mounted to at least one of said first member and said second member; and cladding configured to cover said electronic components.

13. A display assembly comprising:

a framework comprising:

a base;

a first member extending upward from a first side of said base; and a second member extending upward from a second side of said base;

an electronic display subassembly moveably mounted to first member and said second member at an elevated position;

an unobstructed zone located below a lower edge of said electronic display subassembly and between said first member and said second member;

wiring extending within or along at least one of said first member and said second member; and stabilizing members extending between said first member and said electronic display subassembly and between said second member and said electronic display subassembly; or both of:

electronic components for operating the electronic display subassembly mounted to at least one of said first member and said second member; and cladding which covers said electronic components.

* * * * *